Sept. 27, 1949.　　　　R. K. MARSHALL　　　　2,483,216
STAR IMAGE PROJECTING APPARATUS

Filed June 11, 1946　　　　　　　　　　　　　3 Sheets-Sheet 1

INVENTOR.
ROY K. MARSHALL
BY
Raymond J. Crowley
HIS ATTORNEYS

Sept. 27, 1949.   R. K. MARSHALL   2,483,216
STAR IMAGE PROJECTING APPARATUS
Filed June 11, 1946   3 Sheets-Sheet 2
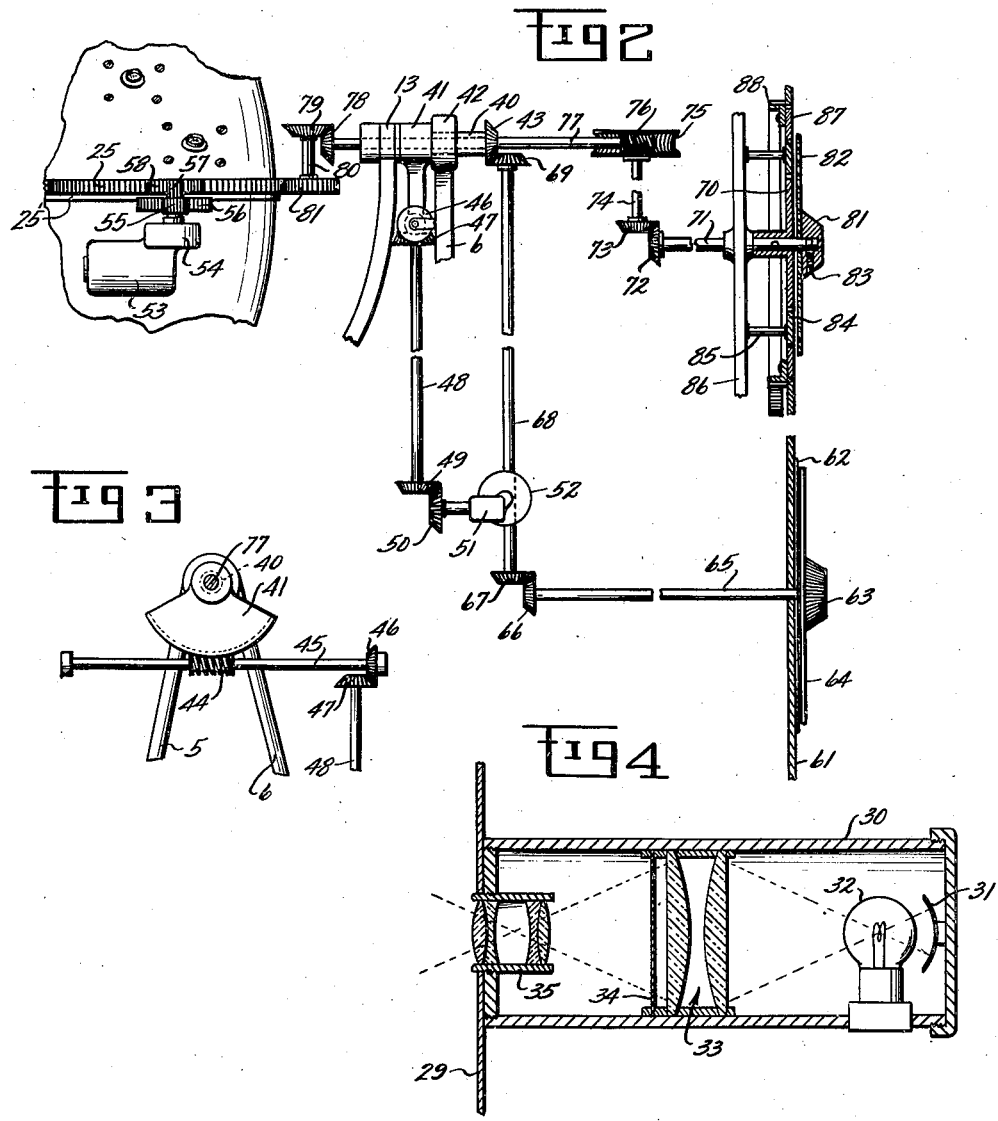
INVENTOR.
ROY K. MARSHALL
BY
HIS ATTORNEYS

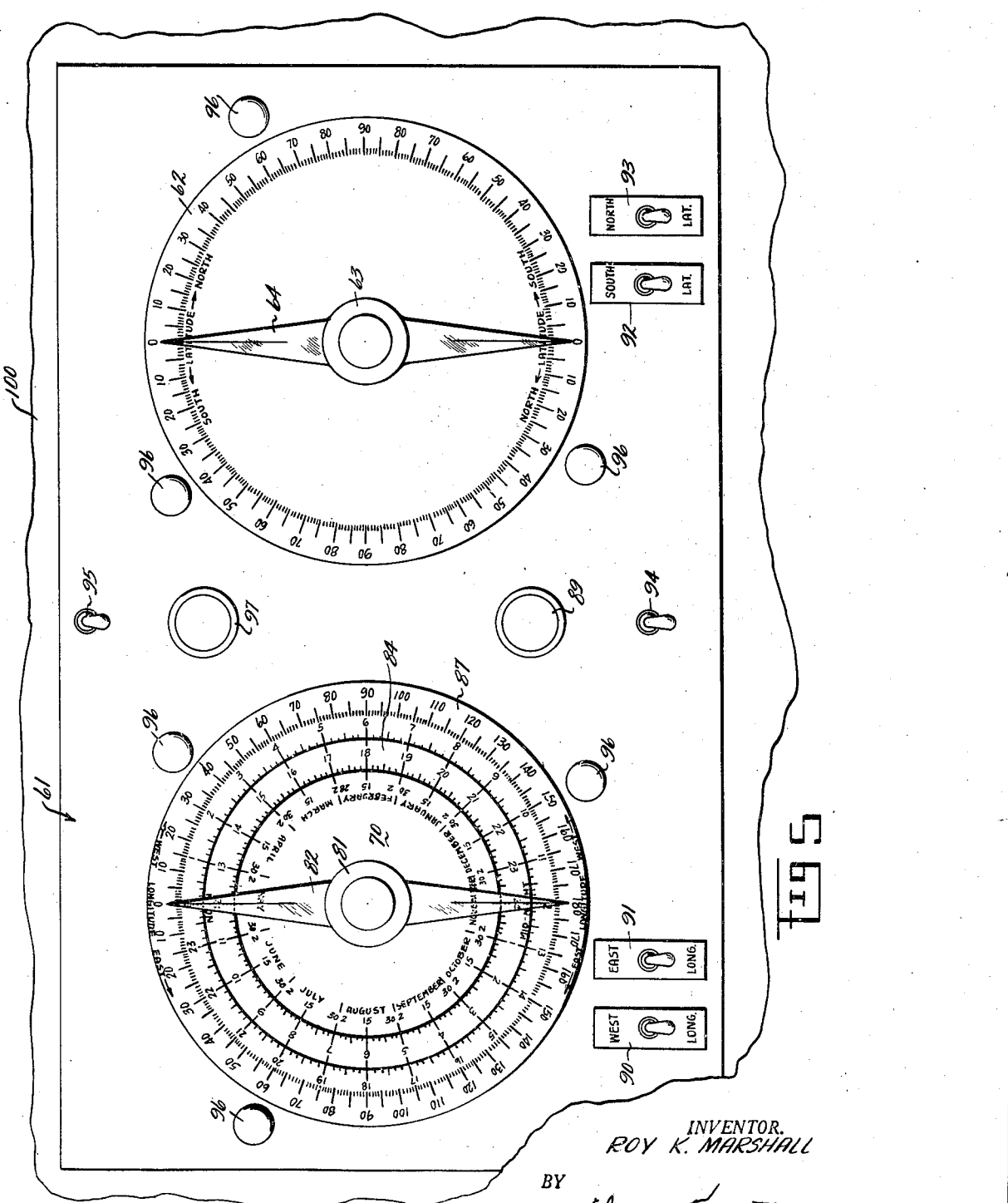

Patented Sept. 27, 1949

2,483,216

UNITED STATES PATENT OFFICE 2,483,216

STAR IMAGE PROJECTING APPARATUS

Roy K. Marshall, Narberth, Pa.

Application June 11, 1946, Serial No. 675,978

8 Claims. (Cl. 88—24)

The present invention relates to an apparatus for projecting star images onto a spherical screen or dome for study and observation of the relative positions and magnitudes of the stars, as well as the star movements relative to the earth.

There have been various types of projectors proposed for use in astronomical instruction, and these devices are often made to show not only the known stars and planets, but also to continuously show their movements relative to the observer located at any predetermined position on the earth. A typical example of projecting apparatus known to the general public is the Zeiss Planetarium, which serves the purpose well but is complicated in construction and is costly to build and to install. This type of projector is disclosed in the Villiger and Bauersfeld Patent No. 1,693,969, and may be described briefly as a twelve foot hollow dumb-bell mounted for rotation on an axis near the longitudinal center and mounted for movement between a pair of piers or pedestals. The dumb-bell structure includes multiple projectors for showing the simulated heavens on the surface of a dome forming the ceiling of the planetarium room. The dumb-bell like projector structure is controlled by motors under control of the operator, and are so arranged as to produce an accelerated "moving picture" of the heavens, authentic in every detail normally seen by the eye of an observer in looking at a cloudless sky.

The principal object of the present invention is to provide a star projector or stellerium which will accurately picture the most important stars on a hemispherical projection field and which can be adjusted at will to give such a representation as would be seen by an observer at any point on the earth at any predetermined time. In the accomplishment of this general object it is also desired to simplify as much as possible the construction of the stellarium.

A related object of the invention is to simplify the mounting of a star projector by providing a hollow sphere having an interior light source and by utilizing the portion of the sphere corresponding to the south celestial polar region for location of a sphere supporting bearing. Thereby it is possible to take advantage of the fact that there are no stars within about twenty degrees of the South Celestial Pole bright enough to be included in the scope of the stellarium.

The south pole of the heavens lies in the dim constellation Octans, and there is no star as bright as Polaris (North Star) within twenty degrees of this point. This fact is brought out in "An Introduction To Astronomy" by Robert H. Baker (1940; page 116), published by D. Van Nostrand Company. In the same text, reference to the star maps on pages 108 and 109 illustrate these statements clearly.

A further object of the invention is to provide a star projector having a spherical projection globe and to mount the sphere for rotation about two principal axes at right angles to each other so that the star pattern as seen may be made to correspond with that of a selected location on the earth. It is also a related object to provide indicating means which will show at any time the relative orientation of the spherical projection globe.

The above and other objects of the invention will become apparent upon reading the following detailed description in conjunction with the drawings, wherein:

Fig. 2 is a schematic view of the projector drive mechanism and also showing in cross-section the means to indicate the projector position.

Fig. 3 is a schematic view of the drive for the projector which is adapted to move the projector in such a way as to simulate changes in latitude of the observer.

Fig. 4 is a longitudinal cross-sectional view of the star projection units which may be used in the stellarium.

Fig. 5 is an elevation view of the projector position indicator and control panel.

Figure 1:
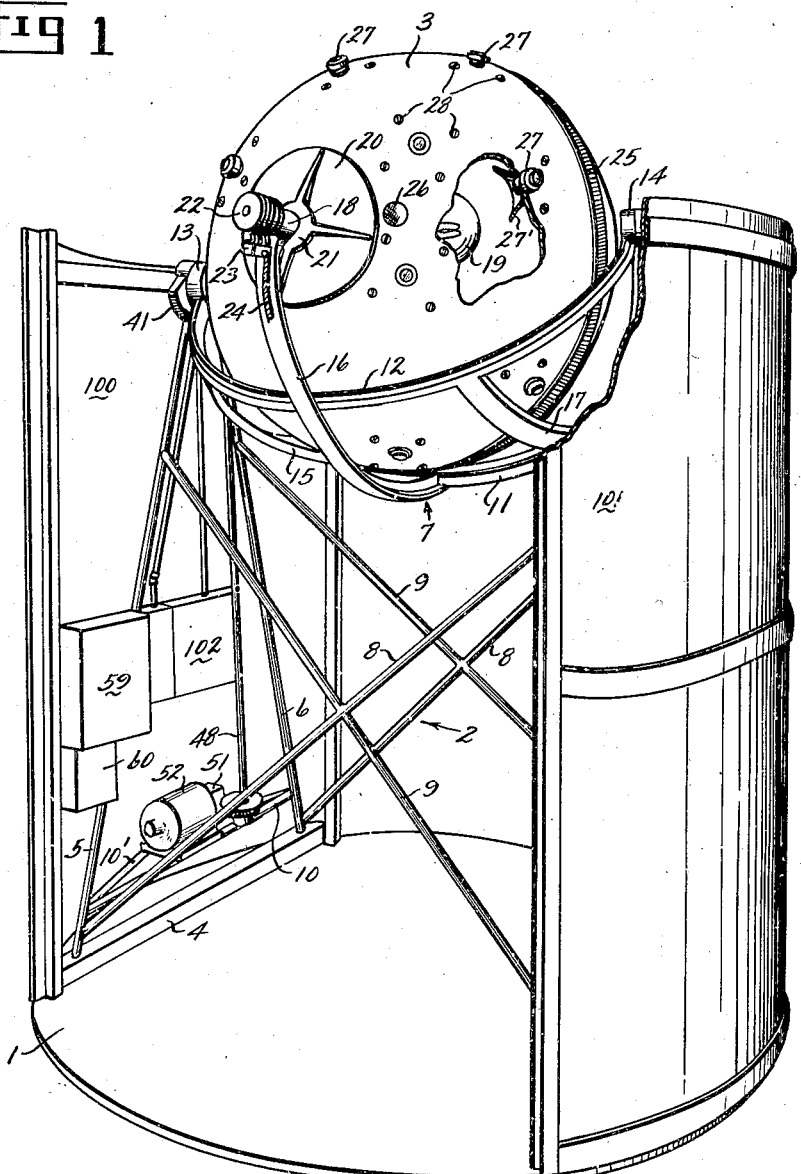
Fig. 1 is a perspective view of the complete stellarium, except for the two removable curved side panels which are omitted to illustrate some of the structural arrangements.

Referring first to Fig. 1 of the drawings the stellarium will be seen to have a base 1, frame 2 and star projection sphere 3. The base 1 is preferably a circular plate carrying at opposite sides a pair of frame-supporting bars 4. Secured to and extending upwardly from each bar there are two converging rods 5 and 6 which meet to support a bearing for the sphere-carrying cradle 7. Extending diagonally between and secured to the opposite sets of rods 5 and 6 are crossed rods 8 and 9, forming X-frames which provide proper spacing of rods 5, 5 and 6, 6. Secured near the lower ends of rods 5 and 6 are cross-rods 10, to complete the structure of frame 2. The frame rods comprising the frame 2 are preferably welded together in the relative positions as shown in Fig. 1.

The sphere-carrying cradle 7 comprises a pair of semi-circular bars 11 and 12 welded or otherwise secured at the ends to the bearings 13 and 14. The bars 11 and 12 are connected by curved transverse bars 15, 16 and 17, the middle bar 16 extending beyond the semi-circular bar 12 to provide a polar bearing support by means of an enlarged end portion 18. The bar 16 extends around the sphere through an arc of almost 110° before connecting with the semi-circular bar 11, the latter being located above the equator accordingly.

The star projection sphere 3 is a hollow thin-walled structure and may be built of two connected hemispheres, each of which may be of sheet metal spun over a hemispherical form mounted in a lathe. It is also possible to preform by suitable dies a series of complementary segments, which are then welded together to form a complete sphere. The sphere may vary in diameter within wide limits but a diameter of about four feet has been found convenient and satisfactory.

In the region of the sphere corresponding to the South Celestial Pole an opening is provided to receive a socket or receptacle for the central light source 19 carried on a plate 20, this plate having a concave inner surface fitting the outer surface of the sphere and removably fastened thereon. The central light source may be in the form of a 1000 watt electric lamp of the planetarium type, which is characterized by a "drape filament" or a filament of spiral shape to give a concentrated and intense source for uniform radiation in all directions. The lamp itself may be inserted into the sphere through a special removable panel large enough also to permit a person to manipulate the lamp 19. The lamp socket should be adjustable on the plate 20, since it is important that the light source be in the exact center of the sphere.

The plate 20 includes a central bearing or hub 21 to rotatably receive a short tubular shaft secured in the enlarged end portion 18 of the cradle bar 16. Through the tubular shaft there extends an electric cable to connect the light source into the electric circuit of the stellarium. Outside of the sphere the cable makes connection to a commutator 22 carrying slip rings on which bear brushes 23 connected in turn to electric cable 24 extending along the bar 16 and eventually to a trunk cable secured on the semi-circular bar 11. The sphere is supported for rotation on its polar axis by the shaft above mentioned and also by means of rollers mounted on the bars 15 and 17 adjacent to the circular rack bar or track member 25. This rack bar has its edge portion nearest the North Celestial Pole uncut so as to provide a smooth track 25' for continuous engagement by the rollers, while each of the rollers is provided with a flanged edge to form combined thrust and radial bearings for the sphere. The flanges provided on the rollers are arranged and proportioned so as to extend over the side of the track 25' remote from the south polar region, to thus assist in maintaining the bearing plate 20 in firm engagement with the enlarged end 18 of the cradle bar 16. Each of the rollers is rotatably mounted on a small bracket which is in turn securely fixed on the respective bars 15 and 17. These roller and bracket assemblies are concealed from view in Fig. 1 by the bars 15 and 17, and by the sphere 3. The rack bar 25 is conveniently made in several segments and secured to the sphere to form a complete circle at the equatorial circumference.

Since the sphere 3 is mounted for rotation on its polar axis and since the cradle members 11 and 12 within which the sphere is rotatably mounted are semi-circular, it thus follows that the axis of the cradle bearings 13 and 14 will intersect the polar axis of the sphere at the geometrical center thereof.

Connected in parallel with the lamp 19 there may be a small fan or blower located inside the sphere and secured to the wall near the north polar region. The purpose of the fan is that of cooling the lamp 19 by a flow of air which is drawn into the sphere through a port 26 having a light stopping cover thereover. The air is drawn across the hollow sphere and exhausted through another port on the side of the sphere opposite to the port 26. It is generally preferable to use several ports 26 arranged in a circular pattern around the plate 20. The fan being connected in parallel with the lamp 19, its cooling effect will be exerted at all times when the lamp is turned on.

The projection of star images onto the domed ceiling of the instruction room is accomplished by locating a series of lens assemblies 27 on the surface of the sphere 3. Each lens assembly is preferably held in place within a sphere aperture by means of a nut threaded over the lens mount and each assembly may include a plate adjacent the inside surface of the sphere on which the screws 28 may bear to adjust the lens position. Only very slight adjustment should be required when setting up the apparatus for operation in an instruction room. The lens assemblies carry small cones 27' to cut down entrance of reflected light. In each lens assembly there is included a star plate having a series of apertures proportioned to admit varying amounts of light according to the magnitude of the star to be represented. The number and relative arrangement of the lens assemblies is largely a matter of choice, but it has been found that for the purpose of the present stellarium a total of twenty-five lenses is satisfactory. The combined total of star images thus produced is in the neighborhood of three hundred and twenty-five. The images may be projected on any average-size domed ceiling, but the lenses may require focusing if the stellarium is to be adapted for use in rooms of various sizes. However, a projection dome of twenty foot radius has been found suitable for use with the present stellarium.

In place of the central light source as described above, it is possible to employ a small lamp adjacent each lens and for illustration of a workable embodiment of such a lens and light source reference is made to Fig. 4 of the drawings. As shown in this view, there is provided a base plate 29 which is adapted for fastening onto the inside surface of the sphere. Carried on the base plate there is a tubular housing 30 containing a concave reflector 31, an electric lamp 32, a collector lens assembly 33, a star plate 34, and a resolving lens assembly 35. The lens group 35 is so proportioned and designed as to focus the light passing through the star plate onto the projection dome employed.

As stated above the frame rods 5 and 6 at opposite sides of the sphere support bearings for the cradle 7. Through these bearings project stub shafts secured to the cradle bearings 13 and 14. By rotating the cradle about the stub shafts it is possible to simulate changes in latitude of the star observer. This latitude control is effected by a drive mechanism which includes a hollow stub shaft 40 integral with a gear sector 41, the latter being non-rotatably connected to the cradle bearing 13 (see Figs. 2 and 3). The shaft 40 extends to the right in Fig. 2 through a stationary bearing 42 at the upper end of frame rods 5 and 6, connecting at the outer end to a bevel gear 43 which is geared in turn to a latitude indicator to be described below. The gear sector 41 is adapted to be rotated through a partial revolution by a worm 44 mounted on a shaft 45. The shaft 45 also carries a bevel gear 46 meshing with another bevel gear 47 carried on another shaft 48, which extends downwardly to a set of bevels 49, 50 and thence through a reducing gear box 51 to an electric motor 52. The motor is mounted on the cross-rod 10 and also on a rod 10' welded at its ends to the frame rods 5 and 6.

The mounting of the sphere for rotation about the polar axis has been explained above, including the circular rack bar 25. In order to drive the sphere on its polar axis a drive motor 53 is provided, which mounts on a plate bridging the bars 15 and 16 adjacent to the curved rack bar. The motor housing carries a reducing gear box 54 through which is driven a pinion 55 meshing with a gear wheel 56. On the shaft of gear wheel 56 there is another pinion 57 driving a gear wheel 58 which directly engages the rack bar 25. The electric cable for motor 53 extends to a trunk cable extending along the bar 11 to a point adjacent the cradle bearings, the trunk cable then extending downward along rod 5 to a junction box 59 to which electric power is supplied from a line switch 60. Also a cable from latitude control motor 52 is connected into junction box 59. To prevent over-travel of motor 53 the gear sector 41 may if desired operate limit switches to cut off this motor when the worm wheel 44 nears either end of sector 41.

In order to give the instructor a guide for the sphere operation the stellarium includes an indicator panel 61 also serving to mount the control switches. Referring to Fig. 5 it will be seen that panel 61 carries the left-hand longitude dial and the right-hand latitude dial. The latitude dial member 62 is stationary on the panel 61, but in the center of the dial there is a knob 63 having a pointer 64 fixed thereon. The knob is fixed to a shaft 65 extending rearwardly to a bevel gear 66, the latter meshing with a bevel gear 67 on shaft 68. The shaft 68 also carries another bevel gear 69 meshing with a bevel 43 previously mentioned, the latter being rigid with the tubular shaft 40 and gear sector 41. The coordination between the cradle 7 and latitude indicator is such that the projector sphere 3 is always in a relative position as indicated by the latitude scale. For instance an indication of 90° north latitude would mean that the north polar region of the sphere would be uppermost and the North Star (Polaris) would then be simulated at the zenith of the projection dome. In this position the supporting plate 20 would be at the lowest point of its movement and the rack bar 25 would lie in a horizontal plane.

The longitude indicating means at the left-hand side of the panel 61 includes an inner dial 70 mounted on a shaft 71 so as to be flush with the panel. The shaft 71 and dial 70 are driven by means of a pair of bevels 72, 73, a shaft 74, worm wheel 75, worm 76, shaft 77, bevels 78, 79, shaft 80 and pinion 81, the latter meshing with the rack bar 25 as shown in Fig. 2. The shaft 77 is rotatably mounted in the tubular shaft 40, gear sector 41 and bearing 13. Fric-tionally mounted on the outer end of shaft 71 there is a knob 81 and pointer 82, which are retained on the shaft by means of a spring detent 83. Thus the pointer 82 fixed to knob 81 can be set independently of the shaft 71 but is still adapted to move therewith when the sphere is rotated on its polar axis by the longitude control motor and gearing. As seen in Fig. 5 the dial member 70 is marked in calendar days to represent the full year. Surrounding the dial 70 there is an annular dial 84 marked in twenty-four main divisions to represent the full day. The dial 84 is stationarily mounted by means of posts 85 extending rearwardly to connect with a bearing plate 86. Surrounding the stationary dial 84 there is another annular dial 87 which is rotatably mounted in a position flush with panel 61. This movable dial carries longitude graduations and also the corresponding Greenwich time scale. Carried on the rear side of dial 87 there is a ring gear 88 controlled by a pinion carried on the shaft of control knob 89, to give a vernier action. For example the ratio may be such that eight revolutions of knob 89 are required to rotate dial 87 through one revolution.

The pointers 64 and 82 are symmetrical or double pointed in form but it is to be understood that only one end portion is used at a time for indication of sphere movements. While the schematic gearing layout of Fig. 2 does not show the shaft bearings completely it is also to be understood that the shaft 80 is mounted in a carrier or spider which is rotatably mounted on the shaft 77. Thus when the sphere 3 is rotated by movement of the cradle 7, the shaft 80 and gears mounted thereon are free to rotate with the sphere, allowing pinion 81 to be always in mesh with the rack bar 25.

The panel 61 carries longitude control switches 90, 91 and latitude control switches 92, 93. These switches connect the control motors to the current source through the junction box 59, it being understood that the motors are of the reversing type to give the cradle and sphere traverse in opposite directions at the will of the instructor. On the panel also is a switch 94 for the projector light source and a switch 95 to operate the panel lamps 96. Also a rheostat knob 97 is shown, the rheostat being merely to dim the panel lamps 96 after the dials have been properly set for demonstration of the star pattern for a particular time and place. It is desirable to include in the junction box 59 a set of interlocking relays so connected in the motor circuits that a motor which has been set running in one direction cannot be reversed until first turned off at the motor control switch.

Operation of the stellarium is best accomplished by following a set procedure which will now be explained. The general object as before stated is to obtain a good representation of the star pattern for a particular location on the earth at a particular time. The first step is to cause traverse of the cradle 7 by operation of switch 92 or 93 until the latitude pointer 64 is opposite the desired point of latitude. Having set the cradle properly, the instructor then sets the pointer 82 carried by knob 81 on the month and day (dial 70) under consideration without moving any of the dials associated with the longitude indication. The next step is to turn on one of the switches 90 or 91 to cause the sphere to rotate on its polar axis, thus moving the dial 70 and pointer 82 together until the pointer comes to the hour of the day under consideration (dial 84). The sphere is then stopped, and the dial 87 is rotated by means of knob 89 until the zero longitude is opposite the pointer and lined up also with the date and time previously set. It is now only necessary to throw either of the switches 90 or 91 to move the pointer to the desired longitude east or west of the zero mark on scale 87. The result will then give the star pattern for the conditions of time and place set into the dials by the above stated procedure. The longitude traverse by motor 53 may also be used to simulate the star movement with respect to the earth but this will of course give the effect of an accelerated movement of the stars as they rise and set. The scope of the stellarium may be increased or decreased depending on authenticity desired in the final result. With the present stellarium having a total of three hundred and twenty-five stars it is possible to include only a limited number of fourth magnitude stars.

To complete the stellarium it is necessary to provide an outer housing of cylindrical shape rising from the circular base 1 to a level even with the rack bar 25, when the sphere is oriented to place the north polar region uppermost. The housing is built of four separate shell portions of which only two are shown (Fig. 1) and designated 100 and 101. These two shells are permanently secured to the base and are built to fit a pair of complementary and removable shells which when positioned will complete the housing. The shell 100 serves to carry the junction box 59, switch box 60 and control panel housing 102. The control panel 61 carried by the housing 102 is exposed on the outside of shell 100 and on this panel is grouped all the necessary controls, except the line switch 60. The stellarium housing comprising the four complementary shells serves the purpose of stopping the simulated star light from reaching the side walls and floor of the instruction room, which would thus cause confusion.

The embodiments of the invention herein shown and described are to be regarded as illustrative only and it is to be understood that the invention is susceptible to variations, modifications and changes within the scope of the appended claims.

I claim:

1. An apparatus for projecting star images onto a curved projection field comprising, a cradle member having a pair of spaced bearings forming an axis of rotation for said cradle member, means to support said cradle member for rotation on said axis, a hollow spherical member rotatably mounted in said cradle member between said bearings on an axis at a right angle to the axis of said bearings, said axes intersecting at the geometrical center of said hollow spherical member, a source of light located inside the spherical member, a plurality of lens assemblies mounted in the wall of the spherical member and adapted to transmit light from the light source to the curved projection field, an apertured star plate carried by each lens assembly and having a plurality of image-forming apertures therein, means to cause rotation of the spherical member about either of said axes independently, and means for visually indicating the orientation of the spherical member about each of said axes.

2. An apparatus for projecting star images onto a curved projection field comprising, a cradle member having a pair of spaced bearings forming an axis of rotation for said cradle member, means to support said cradle member for rotation on said axis, a hollow spherical projector rotatably mounted in said cradle member between said bearings on a second axis at a right angle to the axis of said bearings, a source of light located inside the spherical projector, a plurality of lens assemblies mounted in the wall of the spherical projector and each adapted to transmit light from the light source to a limited portion of the curved projection field, an apertured star plate carried by each lens assembly to form a star pattern for projection onto said limited portion of the curved projection field, a supporting plate carried by the spherical projector and having its center approximately at the portion of the spherical projector corresponding to the South Celestial Pole, a bearing in the center of said plate and having its axis coincident with said second axis, means on said cradle member rotatably connected to said bearing, means to cause rotation of said spherical projector and said cradle member about the axis of rotation for said cradle member, means to cause rotation of said spherical projector about said second axis independently of the rotation of said cradle member, and means for visually indicating the orientation of the spherical projector about each of said axes.

3. In an apparatus as defined in claim 2, an equatorial track secured to the spherical projector, rollers carried by said cradle member and continuously engaging said track, and flange means on said rollers to take at least a portion of the lateral thrust of the spherical projector in addition to a major portion of the radial thrust.

4. In an apparatus as defined in claim 2, an equatorial track secured to the spherical projector, a curved rack bar contiguous to said track, rollers carried by said cradle member and continuously engaging said track, and a power driven gear train capable of driving said spherical projector by engagement with said curved rack bar.

5. An apparatus for projecting star images onto a curved projection field comprising, a hollow spherical member, means mounting the spherical member for rotation about two axes at a right angle to each other, a source of light centrally located inside the spherical member, a plurality of lens assemblies mounted in the wall of the spherical projector and each adapted to transmit light from the light source to a limited portion of the curved projection field, an apertured star plate carried by each lens assembly to form a star pattern for projection onto said limited portion of the curved projection field, means to cause rotation of the spherical member about either of said axes independently, one of said axes passing through the portions of said spherical member corresponding to the North Celestial Pole and South Celestial Pole, and the other of said axes lying in the equatorial plane of said spherical member, and means for visually indicating the orientation of the spherical member about each of said axes.

6. An apparatus for projecting star images onto a hemispherical projection field comprising, a cradle member including a pair of semi-circular bars joined at their ends and spaced apart at their mid-portions, said joined ends carrying spaced bearings forming an axis of rotation for said cradle member, means to support said cradle member for rotation on said axis, a hollow spherical star image projector rotatably mounted in said cradle member between said bearings on a second axis at a right angle to the axis of said bearings, a bearing carried by said projector and centered on the portion of said projector corresponding to the South Celestial Pole, said cradle member having a curved bar joining the mid-portions of said semi-circular bars and having a free end portion, means on said free end portion rotatably connected to said bearing carried by said projector, means to cause rotation of said spherical projector and said cradle member about the axis of rotation for said cradle member, and means to cause rotation of said spherical projector about said second axis independently of the rotation of said cradle member.

7. An apparatus for projecting star images onto a curved projection field comprising, a cradle member having a pair of spaced bearings forming an axis of rotation for said cradle member, means to support said cradle member for rotation on said axis, a hollow spherical star image projector having a central light source therein, means carried by said cradle member and projector to rotatably mount said projector between said spaced bearings on an axis at a right angle to the axis of said bearings, said axes intersecting at the geometrical center of said hollow spherical projector, and separate visual indicating means articulated to the projector and cradle member respectively to show the orientation of the projector about each of said axes.

8. An apparatus for projecting star images onto a curved projection field comprising, a cradle member having a pair of spaced bearings forming an axis of rotation for said cradle member, means to support said cradle member for rotation on said axis, a hollow spherical star image projector having a central light source therein, means carried by said cradle member and projector to rotatably mount said projector between said spaced bearings on an axis at a right angle to the axis of said spaced bearings, a curved rack bar carried equatorially of said spherical projector and lying in a plane at a right angle to the axis of rotation of said spherical projector, a motor secured to said cradle member and having a pinion means in driving engagement with said curved rack bar, and a visual indicating device having an indicating element geared to said curved rack bar and adapted to show the orientation of the spherical projector about the axis of rotation thereof.

ROY K. MARSHALL.

REFERENCES CITED

The following references are of record in the file of this patent:

UNITED STATES PATENTS

| Number | Name | Date |
|---|---|---|
| 486,236 | Pierling | Nov. 15, 1892 |
| 1,332,999 | Smith | Mar. 9, 1920 |
| 1,616,736 | Bauersfeld | Feb. 8, 1927 |
| 1,693,969 | Villiger et al. | Dec. 4, 1928 |
| 2,168,799 | Korkosz et al. | Aug. 8, 1939 |
| 2,178,352 | Unglaube et al. | Oct. 31, 1939 |

FOREIGN PATENTS

| Number | Country | Date |
|---|---|---|
| 322,507 | Germany (Finke) | July 1, 1920 |